United States Patent
Watanabe (10) Patent No.: US 10,484,619 B2
(45) Date of Patent: Nov. 19, 2019

(54) IMAGING APPARATUS

(71) Applicant: DENSO CORPORATION, Kariya, Aichi-pref. (JP)

(72) Inventor: Takashi Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 204 days.

(21) Appl. No.: 15/065,497

(22) Filed: Mar. 9, 2016

(65) Prior Publication Data

US 2016/0269603 A1 Sep. 15, 2016

(30) Foreign Application Priority Data

Mar. 10, 2015 (JP) .................. 2015-047379

(51) Int. Cl.
*H04N 5/238* (2006.01)
*H04N 5/225* (2006.01)
*H04N 5/235* (2006.01)

(52) U.S. Cl.
CPC ........... *H04N 5/238* (2013.01); *H04N 5/2254* (2013.01); *H04N 5/2351* (2013.01)

(58) Field of Classification Search
None
See application file for complete search history.

(56) References Cited

U.S. PATENT DOCUMENTS

| | | | | |
|---|---|---|---|---|
| 2002/0012064 A1* | 1/2002 | Yamaguchi | .......... | H04N 5/2254 348/362 |
| 2005/0117027 A1 | 6/2005 | Fukuhara et al. | | |
| 2011/0001872 A1* | 1/2011 | Honsho | .................. | G02B 7/102 348/362 |
| 2011/0196569 A1* | 8/2011 | Lee | ........................... | B60T 7/22 701/31.4 |
| 2012/0127371 A1* | 5/2012 | Watanabe | ............... | G06T 5/007 348/687 |
| 2014/0285511 A1* | 9/2014 | Hoshino | .................. | G09G 5/10 345/590 |

FOREIGN PATENT DOCUMENTS

| | | | |
|---|---|---|---|
| JP | H07-120309 | | 5/1995 |
| JP | H09-051484 | * | 2/1997 |
| JP | 4262566 | | 5/2009 |

* cited by examiner

*Primary Examiner* — Kaitlin A Retallick
(74) *Attorney, Agent, or Firm* — Knobbe, Martens, Olson & Bear, LLP

(57) ABSTRACT

An imaging apparatus mounted to a vehicle includes a lens, an image sensor, a light-blocking panel, and a control unit. The image sensor has a light-receiving surface which receives light from the lens and a plurality of pixels provided on the light-receiving surface. The image sensor acquires brightness of light at each of the pixels on the light-receiving surface. The light-blocking panel is disposed between the lens and the image sensor, which has a plurality of cells that are arranged so as to correspond to the plurality of pixels in the image sensor. In the light-blocking panel, transmittance of light of the cells is variable for each cell. The control unit sets the transmittance of each of the cells in the light-blocking panel corresponding to each of the pixels in the image sensor, based on the brightness of light at each of the pixels acquired by the image sensor.

8 Claims, 5 Drawing Sheets

IMAGING APPARATUS

CROSS-REFERENCE TO RELATED APPLICATION

This application is based on and claims the benefit of priority from Japanese Patent Application No. 2015-047379, filed Mar. 10, 2015. The entire disclosure of the above application is incorporated herein by reference.

BACKGROUND

1. Technical Field

The present disclosure relates to an imaging apparatus for a vehicle.

2. Related Art

To prevent collision between a vehicle and an obstacle, and to prevent deviation of a vehicle from a white line, the following technology has become known in recent years. That is, the obstacle or the white line is recognized through use of an imaging apparatus that is provided in a front portion of the vehicle. Then, the driver is given notification of information based on the recognized obstacle or white line, and the like.

Intense light, such as sunlight during the day and from the headlights of an oncoming vehicle at night, is often incident on an imaging apparatus that captures images of the periphery of a vehicle, such as that described above. In such cases, a normal imaging result may not be obtained from the acquired captured image, depending on the intensity of the incident light. As a result, necessary information is lost. A problem occurs in that the driver cannot be notified of accurate information. To counter this problem, an imaging apparatus in which a gradation generating means is provided between a lens and an image sensor has been proposed (refer to Japanese Patent No. 4262566). The gradation generating means changes the amount of light reaching the overall image sensor or a portion thereof, in stages and in a direction corresponding to the up/down direction.

However, in the configuration described in Japanese Patent No. 4262566, described above, the gradation area is wide and set in advance. That is, the area over which the amount of light is reduced is fixed. In some cases, the amount of light may be reduced even for weak light that reaches the image sensor. Therefore, a problem occurs in that necessary captured-image information may be missing

SUMMARY

It is thus desired to provide an imaging apparatus that adjusts light incident on an image sensor based on the brightness of light incident on the imaging apparatus, and suppresses deficiency in image information.

An exemplary embodiment provides an imaging apparatus that is mounted to a vehicle. The imaging apparatus includes a lens, an image sensor, a light-blocking panel, and a control unit. The image sensor has a light-receiving surface which receives light from the lens and a plurality of pixels provided on the light-receiving surface. The image sensor acquires brightness of light at each of the pixels on the light-receiving surface. The light-blocking panel is disposed between the lens and the image sensor, and has a plurality of cells that are arranged so as to correspond to the plurality of pixels in the image sensor. In the light-blocking panel, transmittance of light of the cells is variable for each cell. The control unit sets the transmittance of each cell in the light-blocking panel corresponding to each of the pixels of the image sensor, based on the brightness of light at each of the pixels acquired by the image sensor.

In a configuration such as this, the brightness of light incident on the image sensor can be adjusted by the light-blocking panel. Deficiency in image information can be suppressed.

DESCRIPTION OF THE EMBODIMENTS

An exemplary embodiment of the present disclosure will be described with reference to the drawings. Reference numbers used in the description of the embodiment below are also used as appropriate in the scope of the claims. However, the reference numbers are used for the purpose of facilitating understanding of the present disclosure and are not intended to limit the technical scope of the present disclosure.

Figure 1:
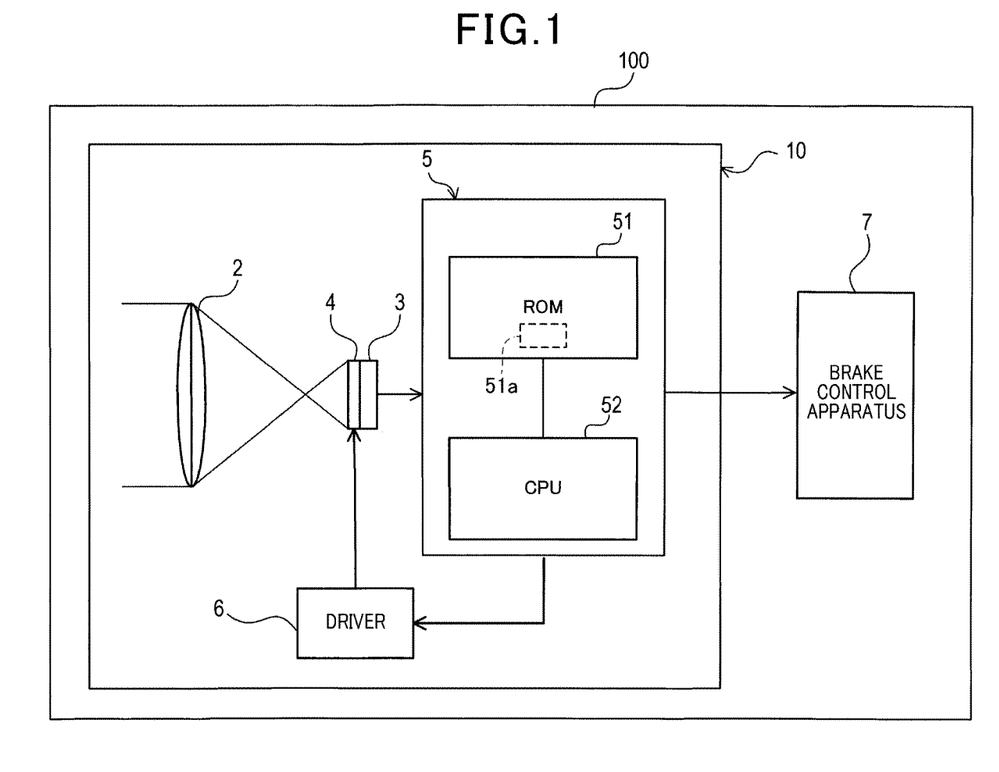
FIG. 1 is a block diagram of a configuration of a vehicle to which an imaging apparatus according to an embodiment is mounted.

A vehicle 100 shown in FIG. 1 includes an imaging apparatus 10 and a brake control apparatus 7. The imaging apparatus 10 includes a lens 2, a CMOS sensor 3, a liquid crystal panel 4, an imaging control unit 5, and a driver 6.

The lens 2 is set in a front portion of the vehicle 100. The lens 2 collects light entering from outside of the vehicle 100 (from ahead of the vehicle 100), and makes the light incident into the liquid crystal panel 4.

Figure 5A:
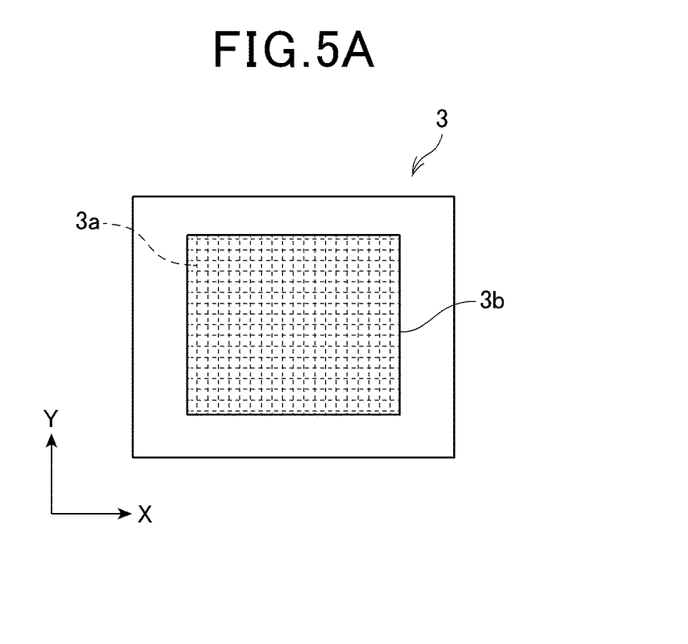
FIG. 5A is a diagram showing a plurality of pixels in the CMOS sensor.

The CMOS sensor 3 receives the light that has entered from outside of the vehicle 100, via the lens 2 and the liquid crystal panel 4, by a plurality of pixels (light-receiving elements) 3a that are arranged two-dimensionally in X and Y directions on a right-receiving surface 3b of the CMOS sensor 3, as shown FIG. 5A. The CMOS sensor 3 generates a signal based on the brightness (magnitude of luminance) of the light received by each pixel 3a, and outputs the signal to the imaging control unit 5.

Figure 5B:
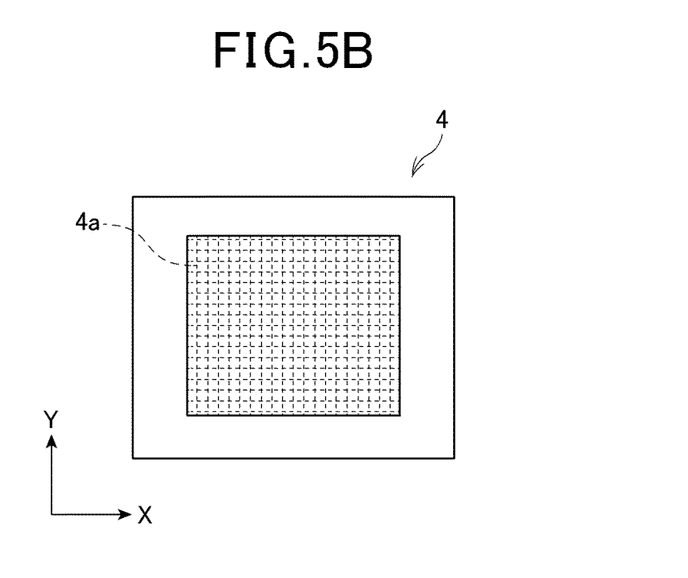
FIG. 5B is a diagram showing a plurality of pixels in the liquid crystal panel.

The liquid crystal panel 4 is disposed between the lens 2 and the CMOS sensor 3. The liquid crystal panel 4 is arranged so as to be in contact with the CMOS sensor 3 and to cover the light-receiving surface 3b of the CMOS sensor 3. The liquid crystal panel 4 has a plurality of pixels (corresponding to cells) 4a that are arranged two-dimensionally in X and Y directions on the liquid crystal panel 4 so as to correspond to the plurality of pixels 3a in the CMOS sensor 3, as shown in FIG. 5B. In the liquid crystal panel 4, transmittance of light passing through the liquid crystal panel 4 is variably set for each pixel.

In the present embodiment, the CMOS sensor 3 and the liquid crystal panel 4 have the same number of pixels (specifically, the same two-dimensional array). The CMOS sensor 3 and the liquid crystal panel 4 are arranged such that the respective pixels form pairs. That is, the lens 2, the CMOS sensor 3 and the liquid crystal panel 4 are arranged such that the light that has entered the lens 2 and passed through each pixel 4a of the liquid crystal panel 4 reaches each pixel 3a of the CMOS sensor 3 paired with each pixel 4a in the liquid crystal panel 4.

The imaging control unit 5 is configured by an electronic control unit (ECU) that includes a known read-only memory (ROM) 15, central processing unit (CPU) 52, random access memory (RAM) (not shown), on-board network controller (not shown), and the like.

According to the present embodiment, the ECU configuring the imaging control unit 5 is a dedicated ECU provided for the imaging apparatus 10. However, an ECU provided for controlling other functions may also be used for the imaging apparatus 10. In addition, a control unit provided for another apparatus (such as a car navigation apparatus) may also be used for the imaging apparatus 10.

The driver 6 controls the transmittance of each pixel 41 of the liquid crystal panel 4, based on a command from the imaging control unit 5. The driver 6 is connected to the imaging control unit 5 and the liquid crystal panel 4.

In a manner similar to the imaging control unit 5, the brake control apparatus 7 is configured by an ECU. The brake control apparatus 7 receives a distance between the vehicle 100 and an obstacle calculated by the imaging control unit 5, from the imaging control unit 5. The brake control apparatus 7 then controls braking of the vehicle 100 based on the distance, such as by automatically applying the brakes when the distance is short.

2. Overview of Transmittance Setting Process

Figure 2:
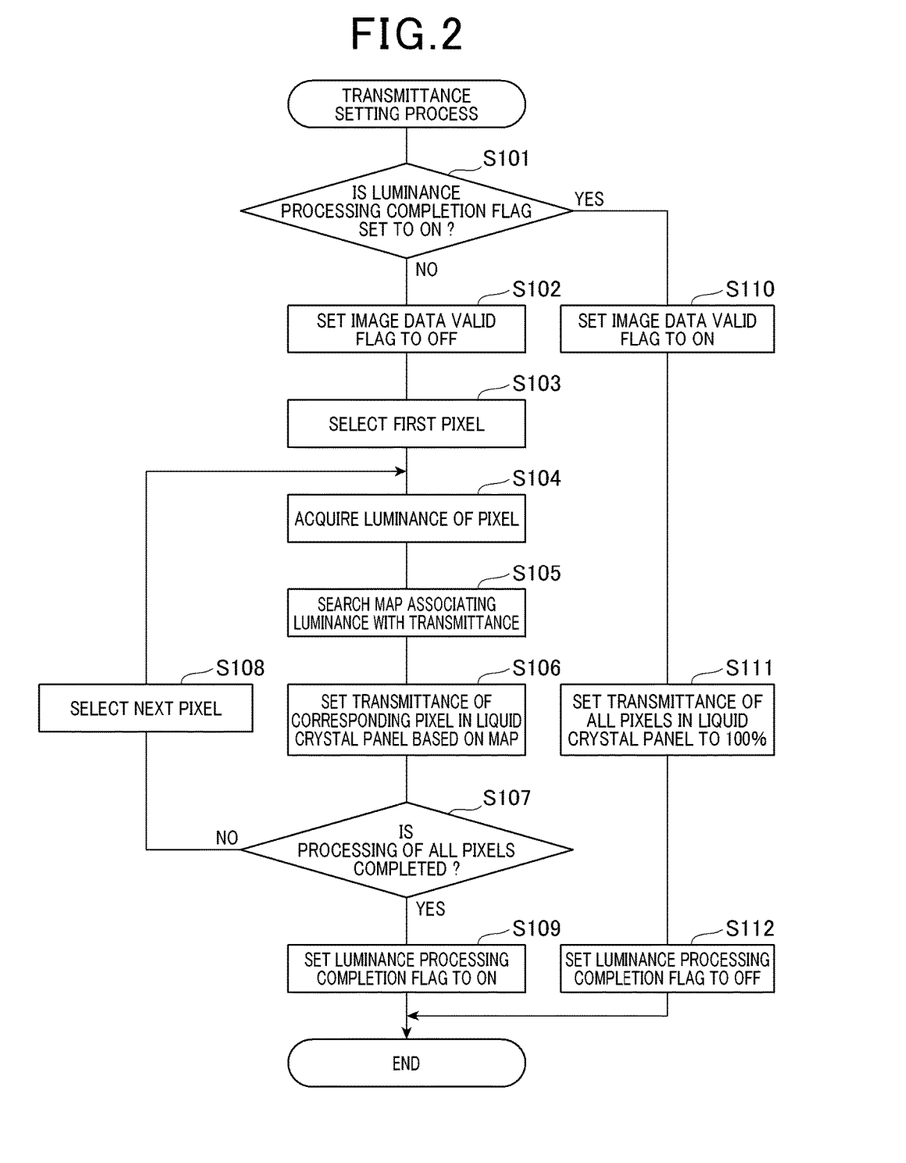
FIG. 2 is a flowchart of a transmittance setting process performed by the imaging apparatus.

Next, an overview of a transmittance setting process actualized by the imaging control unit 5 according to the present embodiment will be described with reference to the flowchart in FIG. 2. The imaging control apparatus 5 starts the transmittance setting process each time the CMOS sensor 3 captures an image in a state in which a shift lever position is set to D (drive) by driver operation. The transmittance of the liquid crystal panel 4 at the start of the transmittance setting process is set to 100%.

First, the imaging control unit 5 determines whether or not a luminance processing completion flag is set to ON (step S101). The luminance processing completion flag herein refers to a flag that is set at step S109. When determined that the luminance processing completion flag is not set to ON (NO at step S101), the imaging control unit 5 proceeds to the process at step S102. Meanwhile, when determined that the luminance processing completion flag is set to ON (YES at step S101), the imaging control unit 5 proceeds to the process at step S110.

At step S102, the imaging control unit 5 sets an image data valid flag to OFF and proceeds to step S103. The image data valid flag herein refers to a flag that is set when the image captured by the CMOS sensor 3 is valid for use in determination of an obstacle, described hereafter.

At step S103, the imaging control unit 5 selects a pixel in a location set in advance as a pixel to be acquired first, among the pixels 3a configuring the CMOS sensor 3. The setting of the location of the first pixel is not particularly limited. For example, the first pixel may be a pixel located at the top left end or the top right end. Alternatively, the pixel positioned in the center portion of the CMOS sensor 3 may be selected.

Next, the imaging control unit 5 acquires the luminance at the pixel from the CMOS sensor 3 (step S104).

Next, the imaging control unit 5 retrieves a preset value of the transmittance of the liquid crystal panel 4 corresponding to the luminance acquired at step S104 from a map 51a in the ROM 51 (step S105). The imaging control unit 5 sets the transmittance of the pixel in the liquid crystal panel 4 corresponding to the pixel in the CMOS sensor 3 of which the luminance has been acquired (step S106).

Here, an example of the detailed processes at S105 and S106, performed by the imaging control unit 5, will be described. First, during the operation of the process at step S105, the CPU 52 reads out a program for map search stored in the ROM 51. The CPU 52 performs a predetermined process, described hereafter, based on the program for map search. As a result, the transmittance of each pixel in the liquid crystal panel 4 is set.

Figure 3:
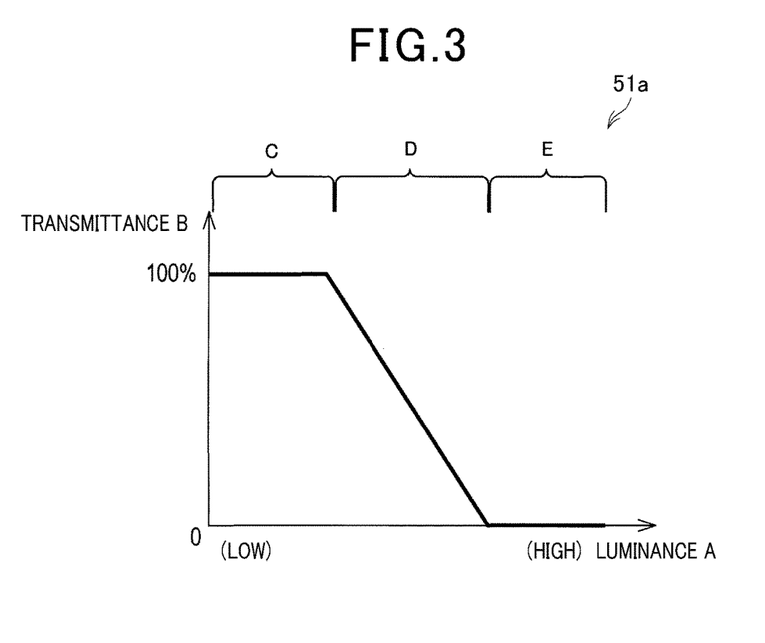
FIG. 3 is a diagram of a map in which transmittance of a liquid crystal panel to luminance of a complementary metal-oxide-semiconductor (CMOS) sensor is set.

As shown in FIG. 3, the map 51a herein refers to a two-dimensional map. In the map 51a, transmittance B of the pixels in the liquid crystal panel 4 is stored in advance based on the magnitude of luminance A in the CMOS sensor 3 acquired by the imaging control unit 5. The luminance A indicates the brightness of the light entering from outside of the vehicle 100. The transmittance B is a value that is optimally set such that image information acquired by the imaging apparatus 10 can be acquired normally, even when the luminance of the light from ahead of the vehicle 100 that is incident on the imaging apparatus 10 is high.

Specifically, as shown in FIG. 3, the luminance A is divided into a range C, a range D, and a range E. The range C is a range of the luminance A over which the imaging control unit 5 is able to normally acquire the image information. When the acquired luminance A is within the range C, the imaging control unit 5 sets the transmittance B to 100%. The range D is a range of the luminance A from a magnitude at which the image information acquired by the imaging control unit 5 becomes deficient (cannot be normally acquired), and higher. In addition, the range D is that over which a normal image can be acquired by the transmittance B being set to a low value. When the acquired luminance A is within the range D, the imaging control unit 5 sets the transmittance B to be lower based on the magnitude of the luminance A. The range E is a range of the luminance A in which the magnitude is so high that the imaging control unit 5 cannot acquire the image information normally. When the acquired luminance A is within the range E, the imaging control unit 5 sets the transmittance B to 0%. The transmittance of each pixel in the liquid crystal panel 4 is set in this way.

Next, as described above, the transmittance of the pixel in the liquid crystal panel 4 that has been set is reflected in the pixel of the liquid crystal panel 4, via the driver 6. The transmittance of the pixel in the liquid crystal panel 4 is thereby set (step S106).

Here, the flow of the series of processes from step S103 to step S108 will be described using an image in the CMOS sensor 3 shown in FIG. 4A and an image on the liquid crystal panel 4 shown in FIG. 4B as an example.

Figure 4A:
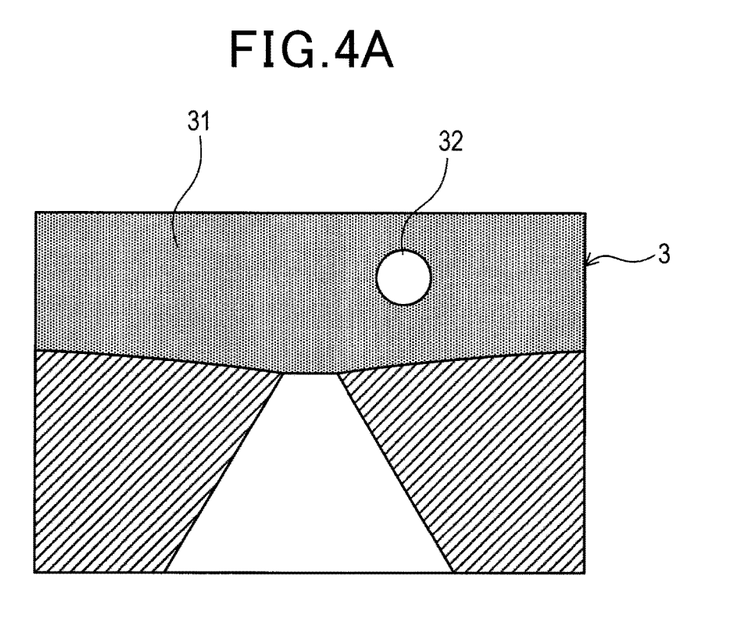
FIG. 4A is a diagram showing an image acquired by the CMOS sensor.
Figure 4B:
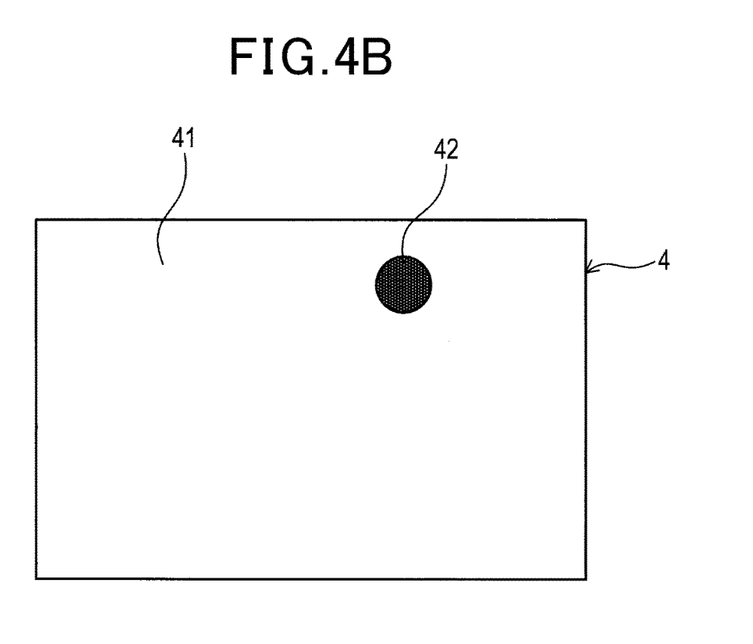
FIG. 4B is a diagram showing an image of a liquid crystal panel in which the transmittance of each pixel is set.

First, it is assumed that a scenery 31 (excluding a sun 32) and the sun 32 appear in an image acquired by the CMOS sensor 3, shown in FIG. 4A. The imaging apparatus 10 acquires the luminance at each pixel of the scenery 31 and the sun 32 (step S104). The imaging apparatus 10 performs a map search (step S105) and sets the transmittance of the liquid crystal panel 4 (step S106).

Here, the luminance in the scenery 31 is assumed to be within the range C over which the image information of the area ahead of the vehicle 100 can be normally acquired. Therefore, as shown in FIG. 4B, the transmittance of the pixels configuring an area 41 of the liquid crystal panel 4 corresponding to the pixels in the CMOS sensor 3 that capture the scenery 31 is set to 100%. Next, the luminance in the sun 32 is assumed to be within the range D, because the light is intense. Therefore, the transmittance of the pixels configuring an area 42 of the liquid crystal panel 4 corresponding to the pixels in the CMOS sensor 3 that capture the sun 32 is set to be lower based on the luminance.

Returning to FIG. 2, next, the imaging control unit 5 determines whether or not the luminance at all pixels in the CMOS sensor 3 has been acquired and the process for setting the transmittance of each corresponding pixel in the liquid crystal panel 4 has been completed (step S107). When determined that processing of all pixels has not been completed (NO at step S107), the imaging control unit 5 proceeds to step S108.

At step S108, the imaging control unit 5 selects the pixel following the pixel of the CMOS sensor 3 that has been selected first, and returns to the process at step S104. The order in which the pixels are selected is set in advance. That is, the imaging control unit 5 repeats the processes from step S104 to step S108 until the processes are performed on all pixels of the CMOS sensor 3.

Meanwhile, when determined that the processing of all pixels of the CMOS sensor 3 has been completed (YES at step S107), the imaging control unit 5 proceeds to the process at step S109.

At step S109, the imaging control unit 5 sets the luminance processing completion flag to ON. Here, the luminance processing completion flag refers to a flag that is set when the processes from step S104 to step S108 have been completed on all pixels of the CMOS sensor 3.

After setting the luminance processing completion flag to ON, the imaging control unit 5 ends the transmittance setting process while maintaining the transmittance of each pixel of the liquid crystal panel 4 that has been set.

Next, the imaging control unit 5 loads an image captured by the CMOS sensor 3 and starts the transmittance setting process again. The image that is loaded here is an image obtained through the liquid crystal panel 4 in which each pixel is set to a transmittance value based on the map search.

At this time, because the luminance processing completion flag is set to ON at step S109 (YES at step S101), the imaging control unit 5 sets the image data valid flag to ON (step S110). The imaging control unit 5 performs a distance calculating process, described hereafter, in parallel with the transmittance setting process. In the distance calculating process, the imaging control unit 5 calculates the distance to the obstacle and transmits the calculated distance to the brake control apparatus 7. The image obtained when the image data valid flag is set to ON is used to calculate the distance to the obstacle. That is, a brake control process performed by the imaging control unit 5 and the brake control apparatus 7 is performed based on an image captured by the CMOS sensor 3 in a state in which the transmittance of each pixel of the liquid crystal panel 4 has been adjusted.

In the brake control process, first, the imaging control unit 5 determines whether or not an obstacle is present ahead of the vehicle 100 from the image acquired by the CMOS sensor 3. When determined at an obstacle is present ahead of the vehicle 100, the imaging control unit 5 calculates the distance between the vehicle 100 and the obstacle, and transmits the calculated distance to the brake control apparatus 7. The brake control apparatus 7 controls the braking of the vehicle 100 based on the received distance.

Next, the imaging control unit 5 sets the transmittance of all pixels in the liquid crystal panel 4 to 100% via the driver 6 (step S111), and proceeds to step S112.

At step S112, the imaging control unit 5 sets the luminance processing completion flag to OFF and ends the transmittance setting process.

Subsequently, the imaging apparatus 10 performs the transmittance setting process each time an image from the CMOS sensor 3 is loaded, while the shift lever position is set to D.

3. Effects

The following effects are achieved according to the embodiment described in detail above.

(1a) The liquid crystal panel 4 is disposed between the lens 2 and the CMOS sensor 3. The liquid crystal panel 4 has a plurality of pixels. The transmittance of light of each pixel is variable for each pixel. The imaging control unit 5 sets the transmittance of each pixel in the liquid crystal panel 4 based on the luminance of light at each pixel in the CMOS sensor 3, acquired by the CMOS sensor 3. Therefore, according to the present embodiment, the imaging apparatus 10 in which the luminance of light incident on the imaging apparatus 10 is adjusted by the liquid crystal panel 4 and deficiency in image information is suppressed can be provided.

(1b) The imaging control unit 5 sets the transmittance of a pixel in the liquid crystal panel 4 to a lower value as the luminance at the corresponding pixel in the CMOS sensor 3, acquired by the CMOS sensor 3, becomes higher. Therefore, according to the present embodiment, the transmittance can be adjusted based on the luminance at the CMOS sensor 3, while suppressing blocking of light necessary for acquisition of the image information.

(1c) The number of pixels in the liquid crystal panel 4 is the same as the number of pixels in the CMOS sensor 3. The liquid crystal panel 4 and the CMOS sensor 3 are arranged such that the respective pixels form pairs. The CMOS sensor 3 is arranged such that the light that has entered the lens 2 and passed through each pixel of the liquid crystal panel 4 reaches each pixel of the CMOS sensor 3 that is paired with a pixel in the liquid crystal panel 4. Therefore, according to the present embodiment, the transmittance of the liquid crystal panel 4 is set based on each pixel of the CMOS sensor 3, and the luminance of light is adjusted. Therefore, the CMOS sensor 3 can receive light having luminance suitable for acquisition of image information. That is, the imaging control unit 5 can acquire more accurate image information.

(1d) The liquid crystal panel 4 is arranged such as to cover the light-receiving surface of the CMOS sensor 3. That is, the liquid crystal panel 4 is in contact with the CMOS sensor 3. Compared to when a space is provided between the liquid crystal panel 4 and the CMOS sensor 3, the light that has passed through the liquid crystal panel 4 can directly reach each pixel of the CMOS sensor 3. Therefore, according to the present embodiment, each pixel of the CMOS sensor 3 can effectively receive light for which the transmittance has been set.

According to the present embodiment, the CMOS sensor 3 corresponds to an example of an image sensor. The liquid crystal panel 4 corresponds to an example of a light-blocking panel. The imaging control unit 5 corresponds to an example of a control unit.

4. Other Embodiments

An embodiment of the present disclosure is described above. However, the present disclosure is not limited to the above-described embodiment. It goes without saying that various embodiments are possible.

(2a) According to the above-described embodiment, a configuration in which the imaging unit 10 captures an image of the area ahead of the vehicle 100 and starts the transmittance setting process in a state in which the shift lever position of the vehicle 100 is set to D is described as an example. However, the present disclosure is not limited thereto. For example, an image of an area behind the vehicle 100 may be captured. The transmittance setting process may be started in a state in which the shift lever position is set to R (reverse). In addition, for example, images of areas ahead of and behind the vehicle 100 may be captured. The transmittance setting process may be started in a state in which the shift lever position is set to either of D and R.

(2b) According to the above-described embodiment, a configuration in which the CMOS sensor 3 is used as the image sensor that picks up light from outside of the vehicle 100 is described as an example. However, the present disclosure is not limited thereto. For example, other image sensors, such as a charge-coupled device (CCD) may be used.

(2c) According to the above-described embodiment, a configuration in which the CMOS sensor 3 and the liquid crystal panel 4 have the same number of pixels is described as an example. However, the present disclosure is not limited thereto. The CMOS sensor 3 and the liquid crystal panel 4 may not have the same number of pixels. For example, the number of pixels in the liquid crystal panel 4 may be greater than the number of pixels in the CMOS sensor 3. The opposite is also possible.

(2d) According to the above-described embodiment, a configuration in which the imaging control unit 5 acquires luminance as the brightness of light at each pixel of the CMOS sensor 3 is described as an example. However, the present disclosure is not limited thereto. Other parameters indicating the brightness of light may be acquired.

(2e) According to the above-described embodiment, a configuration in which the transmittance of the pixels in the liquid crystal panel 4 is set to individual values based on the luminance at the pixels in the CMOS sensor 3, and the transmittance of all pixels in the liquid crystal panel 4 is thereafter set (reset) to 100% is described as an example. However, the present disclosure is not limited thereto. Transmittance setting may not include a reset after the completion of processing of all pixels. For example, after the transmittance of the pixels in the liquid crystal panel 4 is set to individual values, the transmittance may be increased from the individual values by an amount equivalent to a value set in advance, rather than the transmittance being reset. Transmittance setting may then be performed again.

(2f) According to the above-described embodiment, a configuration in which the imaging control unit 5 sets the transmittance B to 0% when the acquired luminance A is within the range E is described as an example. However, the present disclosure is not limited thereto. For example, the transmittance may not be reduced to 0% (that is, the light may not be completely blocked), such as by the transmittance B being set to 20% rather than 0%.

(2g) According to the above-described embodiment, a configuration in which the transmittance of each pixel in the liquid crystal panel 4 is set based on the luminance at each pixel in the CMOS sensor 3 acquired at S104 is described as an example. However, the present disclosure is not limited thereto.

For example, the transmittance may be changed in stages, based on the difference in luminance between adjacent pixels of the CMOS sensor 3. Specifically, it is assumed that the difference in luminance between pixels adjacent to each other with the boundary between the area 41 and the area 42, shown in FIG. 4B, therebetween is equal to or higher than a fixed value set in advance (luminance at area 42>luminance at area 41). In this case, transmittance that is higher than the transmittance that is set in the map 51a and slightly lower than the transmittance for the area 41 is set for the pixels in the area 42 near the area 41 (pixels forming the outer edge of the area 42). The transmittance of pixels slightly inward from the pixels forming the outer edge of the area 42 is set to be further lower than the transmittance of the pixels forming the outer edge. The transmittance in the area 42 may become closer to the value set in the map in stages, as the pixels become farther away from the area 41.

(2h) A function provided by a single constituent element according to the above-described embodiment may be dispersed among a plurality of constituent elements. Functions provided by a plurality of constituent elements may be integrated in a single constituent element. In addition, at least a part of the configuration according to the above-described embodiment may be replaced with a publicly known configuration providing a similar function. Furthermore, a part of the configuration according to the above-described embodiment may be omitted to an extent allowing the problem to be solved. Moreover, at least a part of the configuration according to the above-described embodiment may be added to or replace a configuration according to another of the above-described embodiment. Any embodiment included in the technical concept specified by the wordings of the scope of claims is an embodiment of the present disclosure.

What is claimed is:

1. An imaging apparatus that is mounted to a vehicle, the imaging apparatus comprising:
    a lens;
    an image sensor that has a light-receiving surface which receives light from the lens and a plurality of pixels provided on the light-receiving surface, the image sensor acquiring brightness of light at each of the pixels on the light-receiving surface;
    a light-blocking panel that is disposed between the lens and the image sensor, which has a plurality of cells that are arranged so as to correspond to the plurality of pixels of the light-receiving surface in the image sensor, and in which transmittance of light of the cells is variable for each cell; and
    a control unit that sets the transmittance of each of the cells in the light-blocking panel corresponding to each of the pixels in the image sensor, based on the brightness of light at each of the pixels acquired by the image sensor,
    wherein the light-blocking panel is arranged so as to cover the light-receiving surface of the image sensor and to be in contact with the image sensor such that the plurality of cells covers the plurality of pixels,
    a number of cells in the light-blocking panel is equal to a number of pixels in the image sensor,
    the light-blocking panel is arranged such that each of the cells is paired with a corresponding one of the pixels in the image sensor,
    the image sensor is arranged such that light that has entered the lens and passed through each of the cells in the light-blocking panel reaches each of the pixels in the image sensor that is paired with the corresponding one of the cells in the light-blocking panel, and the control unit sets the transmittance of each of the cells in the light-blocking panel in a state according to a shift lever position of the vehicle being set to a drive position or a reverse position.

2. The imaging apparatus according to claim 1, wherein the control unit sets the transmittance of each of the cells in the light-blocking panel to be lower as the brightness of light at each of the pixels in the imaging sensor acquired by the image sensor becomes higher.

3. A system comprising:
an imaging apparatus that is mounted to a vehicle, which captures an image including an obstacle present ahead of the vehicle, and calculates a distance between the vehicle and the obstacle based on a captured image; and
a brake control apparatus that receives the distance between the vehicle and an obstacle calculated by the imaging apparatus, and controls braking of the vehicle based on the distance,
the imaging apparatus comprising:
  a lens;
  an image sensor that has a light-receiving surface which receives light from the lens and a plurality of pixels provided on the light-receiving surface, which acquires brightness of light at each of the pixels on the light-receiving surface;
  a light-blocking panel that is disposed between the lens and the image sensor, which has a plurality of cells that are arranged so as to correspond to the plurality of pixels in the image sensor, and in which transmittance of light of the cells is variable for each cell; and
  a control unit that sets the transmittance of each of the cells in the light-blocking panel corresponding to each of the pixels in the image sensor, based on the brightness of light at each of the pixels acquired by the image sensor,
wherein the light-blocking panel is arranged so as to cover the light-receiving surface of the image sensor and to be in contact with the image sensor such that the plurality of cells covers the plurality of pixels,
a number of cells in the light-blocking panel is equal to a number of pixels in the image sensor,
the light-blocking panel is arranged such that each of the cells is paired with a corresponding one of the pixels in the image sensor,
the image sensor is arranged such that light that has entered the lens and passed through each of the cells in the light-blocking panel reaches each of the pixels in the image sensor that is paired with the corresponding one of the cells in the light-blocking panel, and
the control unit sets the transmittance of each of the cells in the light-blocking panel in a state according to a shift lever position of the vehicle being set to a drive position or a reverse position.

4. A method for controlling an imaging apparatus that is mounted to a vehicle, the imaging apparatus comprising:
  a lens;
  an image sensor that has a light-receiving surface which receives light from the lens and a plurality of pixels provided on the light-receiving surface, the image sensor acquiring brightness of light at each of the pixels on the light-receiving surface; and
  a light-blocking panel that is disposed between the lens and the image sensor, which has a plurality of cells that are arranged so as to correspond to the plurality of pixels in the image sensor, and in which transmittance of light of the cells is variable for each cell, wherein
  the light-blocking panel is arranged so as to cover the light-receiving surface of the image sensor and to be in contact with the image sensor such that the plurality of cells covers the plurality of pixels,
  a number of cells in the light-blocking panel is equal to a number of pixels in the image sensor,
  the light-blocking panel is arranged such that each of the cells is paired with a corresponding one of the pixels in the image sensor, and
  the image sensor is arranged such that light that has entered the lens and passed through each of the cells in the light-blocking panel reaches each of the pixels in the image sensor that is paired with the corresponding one of the cells in the light-blocking panel, and
the method comprising:
setting, by a control unit provided in the imaging apparatus, the transmittance of each of the cells in the light-blocking panel corresponding to each of the pixels in the image sensor, based on the brightness of light at each of the pixels acquired by the image sensor; and
setting, by the control unit, the transmittance of each of the cells in the light-blocking panel in a state according to a shift lever position of the vehicle being set to a drive position or a reverse position.

5. The imaging apparatus according to claim 1, wherein:
the control unit sets the transmittance of each of the cells in the light-blocking panel based on a map in which a transmittance of each of the cells is stored in advance based on a brightness of light of each of the pixels in the image sensor; and
when a difference in brightness of light between two adjacent pixels in the image sensor is equal to or higher than a predetermined fixed value, the control unit sets a transmittance of a first cell of the cells in the light-blocking panel to be higher than the transmittance of the first cell of the cells stored in the map and to be lower than a transmittance of a second cell of the cells in the light-blocking panel, the first cell corresponding to one of the two adjacent pixels that is higher in brightness of light than an other of the two adjacent pixels, the second cell corresponding to the other of the two adjacent pixels.

6. The system according to claim 3, wherein:
the control unit sets the transmittance of each of the cells in the light-blocking panel based on a map in which a transmittance of each of the cells is stored in advance based on a brightness of light of each of the pixels in the image sensor; and
when a difference in brightness of light between two adjacent pixels in the image sensor is equal to or higher than a predetermined fixed value, the control unit sets a transmittance of a first cell of the cells to be higher than the transmittance of the first cell of the cells stored in the map and to be lower than a transmittance of a second cell of the cells, the first cell corresponding to one of the two adjacent pixels that is higher in brightness of light than an other of the two adjacent pixels, the second cell corresponding to the other of the two adjacent pixels.

7. The method according to claim 4, further comprising:
setting, by the control unit, the transmittance of each of the cells in the light-blocking panel based on a map in which a transmittance of each of the cells is stored in advance based on a brightness of light of each of the pixels in the image sensor; and
when a difference in brightness of light between two adjacent pixels in the image sensor is equal to or higher than a predetermined fixed value, setting, by the control unit, a transmittance of a first cell of the cells to be higher than the transmittance of the first cell of the cells stored in the map and to be lower than a transmittance of a second cell of the cells, the first cell corresponding to one of the two adjacent pixels that is higher in brightness of light than an other of the two adjacent pixels, the second cell corresponding to the other of the two adjacent pixels.

8. The imaging apparatus according to claim 5, wherein the control unit sets the transmittance of each of the cells in the light-blocking panel to be lower as the brightness of light at each of the pixels in the imaging sensor acquired by the image sensor becomes higher.

* * * * *